(12) United States Patent
Kamal

(10) Patent No.: US 11,238,139 B2
(45) Date of Patent: *Feb. 1, 2022

(54) METHODS FOR SECURELY STORING SENSITIVE DATA ON MOBILE DEVICE

(71) Applicant: Mastercard International Incorporated, Purchase, NY (US)

(72) Inventor: Ashfaq Kamal, Stamford, CT (US)

(73) Assignee: Mastercard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/751,534

(22) Filed: Jan. 24, 2020

(65) Prior Publication Data

US 2020/0159914 A1  May 21, 2020

Related U.S. Application Data

(63) Continuation of application No. 15/350,783, filed on Nov. 14, 2016, now Pat. No. 10,546,119.

(51) Int. Cl.
*H04L 29/06* (2006.01)
*G06F 21/14* (2013.01)
(Continued)

(52) U.S. Cl.
CPC ............... *G06F 21/14* (2013.01); *G06F 8/61* (2013.01); *G06F 8/71* (2013.01); *G06F 21/53* (2013.01); *G06F 21/563* (2013.01); *G06F 21/6254* (2013.01); *H04L 9/0662* (2013.01); *H04L 9/0894* (2013.01); *H04L 9/30* (2013.01);
(Continued)

(58) Field of Classification Search
CPC . H04L 9/0662; H04L 63/083; H04L 2209/80; H04L 9/3231; H04L 2209/16; H04L 9/0894; H04L 2209/56; H04L 9/3247; H04L 9/30; H04L 63/0861; H04W 2/0608; H04W 4/80; H04W 12/0609; H04W 88/02; G06F 21/6254; G06F 8/61; G06F 21/53; G06F 8/71; G06F 21/14; G06F 21/563

See application file for complete search history.

(56) References Cited

U.S. PATENT DOCUMENTS

2016/0092871 A1* 3/2016 Gordon ................... H04W 4/06
705/44

* cited by examiner

*Primary Examiner* — Tri M Tran
(74) *Attorney, Agent, or Firm* — Buckley, Maschoff & Talwalkar LLC

(57) ABSTRACT

Methods and systems for protecting sensitive data and applications on a mobile device. In an embodiment, a mobile device processor of a mobile device downloads, from a digital wallet server computer, a mobile wallet application including a white box software development kit (SDK) which includes code protection processes, then obfuscates, by running the code protection processes of the white box SDK, consumer financial data and consumer authentication data and stores the obfuscated consumer financial data and consumer authentication data in a regular memory of the mobile device. The process also includes protecting, by the mobile device processor running the white box SDK, sensitive applications stored in the regular memory which execute during a transaction from attack, and re-obfuscating, by the mobile device processor, at least one of the consumer financial data and the consumer authentication data according to a predetermined time interval.

14 Claims, 4 Drawing Sheets

(51) Int. Cl.
    *H04L 9/32*           (2006.01)
    *H04L 9/06*           (2006.01)
    *H04L 9/08*           (2006.01)
    *H04W 12/06*         (2021.01)
    *H04W 12/069*       (2021.01)
    *H04W 4/80*           (2018.01)
    *G06F 8/61*           (2018.01)
    *G06F 8/71*           (2018.01)
    *G06F 21/53*          (2013.01)
    *G06F 21/56*          (2013.01)
    *G06F 21/62*          (2013.01)
    *H04L 9/30*           (2006.01)
    *H04W 88/02*         (2009.01)

(52) U.S. Cl.
    CPC .......... *H04L 9/3231* (2013.01); *H04L 9/3247* (2013.01); *H04L 63/083* (2013.01); *H04L 63/0861* (2013.01); *H04W 4/80* (2018.02); *H04W 12/068* (2021.01); *H04W 12/069* (2021.01); *H04L 2209/16* (2013.01); *H04L 2209/56* (2013.01); *H04L 2209/80* (2013.01); *H04W 88/02* (2013.01)

METHODS FOR SECURELY STORING SENSITIVE DATA ON MOBILE DEVICE

CROSS-REFERENCE TO RELATED APPLICATIONS

The present application claims the benefit of U.S. patent application Ser. No. 15/350,783 entitled "Methods for Securely Storing Sensitive Data on Mobile Device" filed on Nov. 14, 2016, the entire contents of which are incorporated herein by reference.

FIELD OF THE INVENTION

Embodiments generally relate to processes that permit sensitive cardholder data to be securely stored in a regular storage element of a mobile device. In particular, obfuscation and white box processes are provided to a mobile device of a consumer for use in protecting sensitive data stored in regular memory, and for use to protect applications that execute on the mobile devices from tampering and/or hacking by vandals.

BACKGROUND

More and more transactions are conducted by consumers using their mobile devices, such as cellphones or smartphones. An easily understood and common example of a transaction is a payment transaction (or purchase transaction), and it is important for the user and/or the consumer and/or the cardholder (holder of a payment card account) and/or the consumer mobile device involved in such transactions to be authenticated or validated.

A common authentication method requires the user or consumer to input a username and a preset personal identification number ("PIN") or the like. For example, in order to purchase an item or service with a mobile device, a cardholder may be prompted to select a payment account, provide a username, and provide a mobile device PIN. In an attempt to improve security and prevent fraud, some consumer verification methods (CVMs) require consumers to provide additional authentication credentials (sometimes referred to as "multi-factor" authentication), such as biometric identification data like fingerprint data and/or iris scan data. Since many authentication processes use locally stored data, security data and/or financial data, such as the consumer's PIN and biometric identification data and credit card data, are commonly stored in a memory element or storage device of the user's mobile device, which in many cases does not include any secure hardware components. Such regular memory elements and/or storage devices are vulnerable to attack by hackers.

It would therefore be desirable to provide methods for securely storing sensitive data on a user's mobile device in a manner that prevents hacker attacks (such as reverse engineering attacks) and/or prevents tampering, especially for mobile devices that do not include a secure hardware component.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments, wherein.

DETAILED DESCRIPTION

Figure 1:
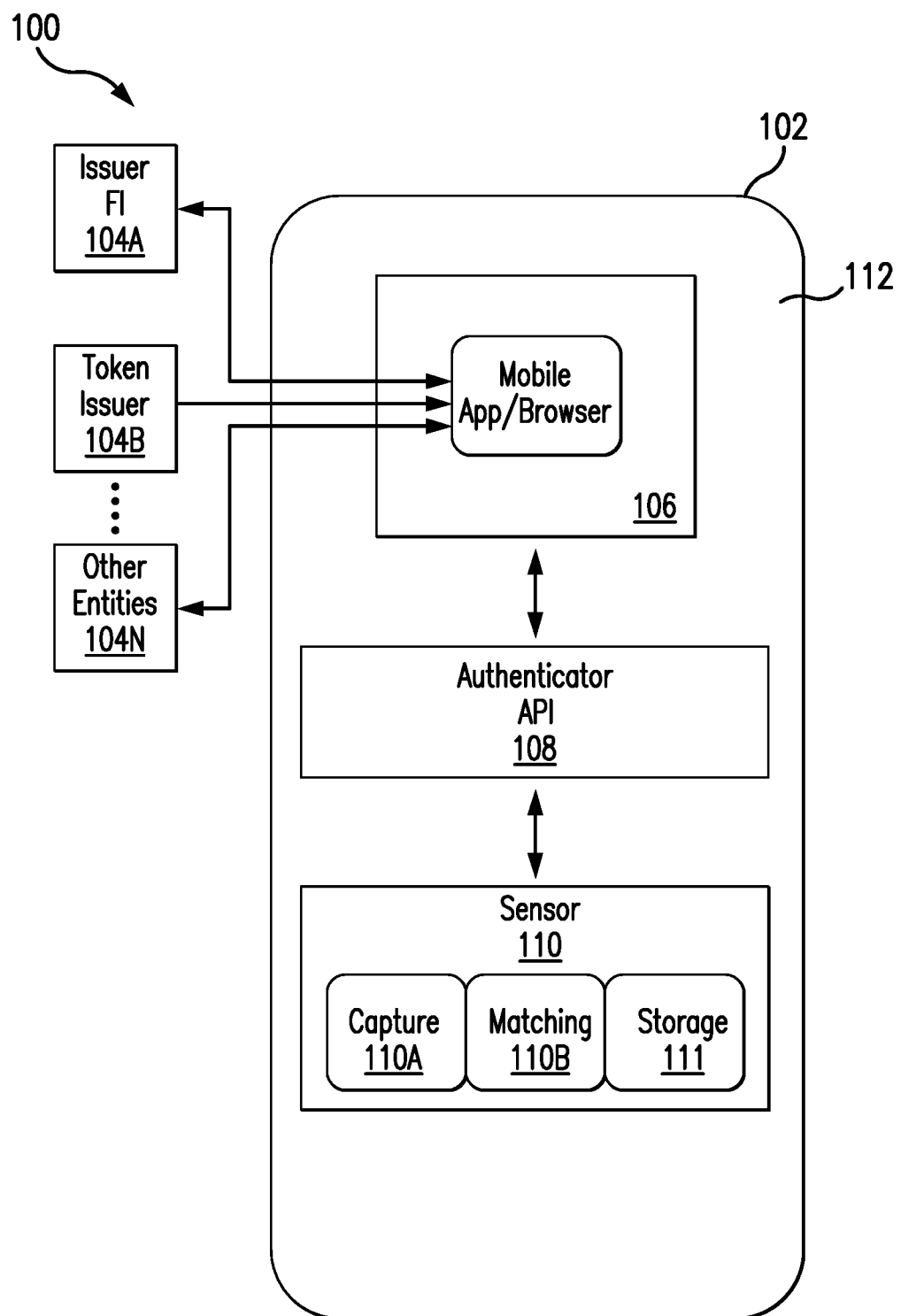
FIG. 1 is a block diagram of a portion of a transaction system in accordance with some embodiments of the disclosure.

In general, and for the purpose of introducing concepts of novel embodiments described herein, presented are methods for providing obfuscation and white box functionality to mobile devices to protect sensitive data stored in regular memory, and to protect applications that execute on the mobile devices from tampering and/or hacking by vandals. In particular, the open nature of open mobile devices (such as Smartphones, tablet computers, personal computers (PCs), laptop computers, personal digital assistants (PDAs), digital music players, and the like) makes the software and data stored on these open devices vulnerable to attacks by software hackers or attackers, because the attacker can gain complete control over the execution platform and software implementations. Consequently, an attacker can analyze the binary code of an application and the corresponding memory pages during execution, which can then enable the attacker to intercept system calls, to tamper with the binary and its execution, and/or enable the attacker to use hacking or attack tools, such as debuggers and emulators to obtain sensitive information.

In order to prevent attackers and/or hackers from successfully hacking or vandalizing the operations of a mobile device (to obtain sensitive data and/or to successfully control one or more software applications running or executing on the mobile device), a mobile device white box software development kit (SDK) is provided that includes a plurality of functionalities configured for obfuscating data and/or for sensing attacks so that security measures can be taken and/or for preventing attacks. The white box SDK may include cryptography processes which may operate as a special purpose code generator that turns a given cipher into a robust representation. For example, operations on a secret key can be combined with random data and code in a manner to provide a representation wherein the random data cannot be distinguished from key information so that a hacker cannot discern the key.

In some embodiments, the white box SDK may be provided to software developers by a payments processing entity, such as MasterCard International Incorporated, for incorporating into their applications. For example, a developer of a mobile device digital wallet application (which may be developed by a third party entity, such as an issuing bank) can incorporate the white box SDK into the digital wallet application to obfuscate sensitive data such as financial data. A consumer would then download the digital wallet application, for example, from a third party entity website, to his or her mobile device for use in making purchase transactions and/or payment transactions. In general, the consumer would be unaware of the functionalities of the white box SDK. However, such a mobile device white box SDK would permit sensitive consumer data, such as a consumer's personal identification number (PIN) and/or biometric data (for example, finger print data, facial recognition data, voice data, and the like) and/or financial data, cryptographic keys and/or secret keys to be securely stored in regular memory of the consumer's mobile device. In addition, in some implementations the mobile device white box SDK operates to protect sensitive communications data, for example, financial data and/or key data communicated to a payment system and/or to an issuer bank when conducting financial transactions, such as purchase transactions. In particular, methods described herein utilize cryptographic processes to obfuscate data before storing that data in regular memory of an open mobile device (such as a consumer's Smartphone or other mobile device that lacks a secure element), and/or to obfuscate software applications which execute on open mobile devices.

Furthermore, because a determined hacker or attacker, given time and resources, could eventually decrypt the obfuscated sensitive data and/or software applications, the disclosed methods include re-obfuscating the sensitive data at predetermined time intervals so as to prevent vandals and/or software hackers from successfully decrypting the obfuscated sensitive data. For example, it may be determined that, based on the cryptographic processes utilized in a given implementation, that an experienced attacker could obtain the consumer's PIN and/or other sensitive data within one month. In such a case, the methods disclosed herein may include a trusted application manager server computer that communicates with the mobile device, updates the consumer's root key every three weeks, and re-obfuscates the consumer's sensitive data at that same time. In addition, one or more of the encryption algorithms, which have been used to encrypt the consumer's sensitive data, may also be obfuscated at that same time interval. Accordingly, the methods and systems described herein ensure the security of the cryptographic assets present and/or stored on the consumer's mobile device even when those cryptographic assets are subjected to white-box attacks by hackers and/or vandals.

A number of terms will be used herein. The use of such terms are not intended to be limiting, but rather are used for convenience and ease of exposition. For example, as used herein, the term "user" may be used interchangeably with the term "consumer" and/or the with the term "cardholder," and these terms are used herein to refer to a consumer, person, individual, business or other entity. Cardholders own (or are authorized to use) a financial account such as a payment card account (i.e., a credit card and/or debit card account) or some other type of account (such as a loyalty card account or mass transit access account). In addition, the term "payment card account" may include a credit card account, a debit card account, and/or a deposit account or other type of financial account that an account holder or cardholder may access. Moreover, as used herein the terms "payment card system" and/or "payment network" refer to a system and/or network for processing and/or handling purchase transactions and related transactions, which may be operated by a payment card system operator such as MasterCard International Incorporated, or a similar processor system or entity. In some embodiments, the term "payment card system" may be limited to systems in which member financial institutions (such as banks) issue payment card accounts to individuals, businesses and/or other entities or organizations. In addition, the terms "payment system transaction data" and/or "payment network transaction data" or "payment card transaction data" or "payment card network transaction data" refer to transaction data associated with payment or purchase transactions that have been processed over a payment network or payment system. For example, payment system transaction data may include a number of data records associated with individual payment transactions (or purchase transactions) of cardholders that have been processed over a payment card system or payment card network. In some embodiments, payment system transaction data may include information that identifies a cardholder, a cardholder's payment device and/or payment account, a transaction date and time, a transaction amount, merchandise or services that have been purchased, and/or information identifying a merchant and/or a merchant category.

Throughout this disclosure, examples associated with financial transactions will be described. However, those skilled in the art will appreciate that embodiments of the white box SDK may be used with desirable results to protect sensitive data and/or software functionality associated with other types of applications and/or transactions, such as transactions permitting a cardholder access to a building and/or online transactions which allow entry into a social gaming environment and the like. The white box SDK may also be configured, for example, to secure an internet session between the user's mobile device and a server using code obfuscation in a manner to prevent "man in the middle attacks." For example, the white box SDK may obfuscate the time of occurrence of the session so that it is unclear to a hacker as to exactly when the mobile device application set up the internet connection, and to ensure code integrity.

Reference will now be made in detail to various novel embodiments and/or implementations, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

FIG. 1 is a block diagram of a portion of a transaction system 100 that includes a consumer mobile device 102 operable to perform a secure user or cardholder authentication process. The transaction system 100 includes a number of devices and/or components and/or entities which interact to conduct a user authentication process as part of a transaction, such as a purchase transaction or a payment transaction. For example, a user or cardholder may operate the consumer mobile device 102 (which may be a Smartphone) to wirelessly interact with an issuer financial institution (FI) computer 104A to conduct a user authentication process to further a purchase transaction. Thus, while only a single consumer mobile device 102 is shown in FIG. 1 along with one access issuer FI 104A, token issuer computer 104B, and an "Other" entity computers 104N, in practice a large number of such consumer mobile devices and/or other components and/or devices (which may include a computer network including, for example, a plurality of interconnected server computers) may be involved in such a transaction system. The Other entities computers 104N may be operated by, but are not limited to, services providers such as Apple Inc., Google Inc., Amazon.com, Inc., Microsoft Inc., nationwide banks and/or regional banks and/or other financial institutions, and the like which may provide, for example, various online services (such as remote payment services) to consumers and/or merchants, and/or may provide one or more websites which offer applications that can be downloaded by the user to the mobile device 102.

As shown in FIG. 1, the consumer mobile device 102 has a number of logical and/or functional components (in addition to hardware components typically found in a mobile device, such as an antenna, one or more mobile device microprocessor(s), one or more memory devices or storage devices, a mobile device camera, one or more sensors, a display component, and the like, which are not shown). In the example shown in FIG. 1, a mobile application and/or Internet browser 106, an authenticator application programming interface (API) 108, and at least one sensor 110 are configured to function in a rich execution environment (REE) 112. The REE 112 is not a secure processing environment, but it is used by the device operating system (OS) and other applications that execute or run on the mobile device 102. The sensor 110 may represent one or more biometric sensors, such as a fingerprint sensor and/or a microphone and/or a camera, and each such biometric sensor may be configured to handle and/or manage biometric data capture, biometric data storage, and/or biometric data matching. In particular, in some implementations the biometric sensor(s) 110 operate to capture biometric sample data from a user with a biometric capture application 110A, and then utilize a biometric matching application 110B to attempt to match the biometric sample taken from the user to one or more biometric templates (or biometric data) that have been previously stored locally in a storage component 111, when attempting to authenticate the user. Thus, in the example shown in FIG. 1, the biometric template(s) or biometric data are stored within the biometric sensor 110 itself, in a memory component 111 of the sensor. However, in some other embodiments, the biometric data can be stored in a shared memory component or shared storage device (not shown), which also may not be associated with a secure operating environment.

The consumer mobile device 102 may thus be configured to perform different types of user or cardholder verification methods (CVMs) locally to authenticate a user, wherein any particular CVM may depend on criteria specified by any of a plurality of third party entities. For example, in the context of a purchase transaction, Merchant 1 may require a user to enter a mobile personal identification number (mPIN) and provide fingerprint data to authenticate the user, whereas for a similar transaction Merchant 2 may require a CVM that requires the user to provide facial data (by using a digital camera of the user's mobile device to take a photograph of the user).

Accordingly, during a transaction requiring user authentication to proceed, an issuer financial institution (FI) 104A, for example, may transmit a request for an on-behalf-of (OBO) biometric user authentication process to the mobile device 102, which is received by the mobile application 106. (It should be understood that another platform, or another trusted calling party, may make such a user authentication request.) In such cases, the OBO biometric authentication process may be predetermined or pre-arranged by an entity, such as a payment processing network, and advantageously enhances and/or speeds up transaction processing because the user authentication processing is handled by the consumer's mobile device instead of requiring authentication data to be transmitted and verified by, for example, a remote server computer operated by an issuer financial institution. After receiving the OBO authentication request, the mobile device application/browser 106 transmits a request to one or more sensors 110 for biometric data capture via the exposed authenticator API 108. The authenticator API 108 then implements an access control mechanism (not shown) which checks that the mobile application 106 is authorized to use the authenticator API 108. If the mobile application/browser 106 is so authorized, the user is then prompted (for example, by a message displayed on a display screen of the consumer's Smartphone) to provide one or more forms of biometric data by using the sensor(s) 110. For example, predetermined business rules concerning user authentication for a purchase exceeding one hundred dollars ($100) may require a consumer to provide two forms of biometric data (for example, a fingerprint and a voice print). In this case, a fingerprint sensor and a microphone each captures the appropriate biometric data from the user, and performs a matching process involving data stored locally in regular memory. If a match occurs for the captured user biometric data (both the fingerprint data and the voice print data) and the biometric template(s) (which have been generated and stored on the sensor(s) during a user authentication enrollment and device registration process, not describe herein) then an authentication response is transmitted back to the mobile application/browser 106 via the authenticator API 108 for forwarding to the issuer FI 104A (or to another trusted calling party which made the authentication request, such as the Token issuer 104B).

Accordingly, sensitive data associated with or representative of sensitive information, such as the consumer's personal identification number (PIN), the consumer's payment credentials (i.e., the consumer's payment card account number(s)), the consumer's biometric identification data, and/or the consumer's electronic wallet identifier, needs to be securely stored on the consumer's mobile device in order to prevent tampering with, or the stealing of, such data by software hackers and/or the like vandals. This is especially important for mobile devices that do not have secure hardware elements, or that do not support trusted execution environment (TEE) technologies. Thus, in accordance with methods disclosed herein, code protection and/or obfuscation techniques are utilized to encrypt the sensitive data resulting in obfuscated data which can then be stored in regular (or non-secure) memory of the consumer's mobile device. However, as mentioned earlier, given time and resources, a determined hacker or attacker will eventually be able to decrypt the obfuscated data. Thus, the disclosed methods also include re-obfuscating the sensitive data at a predetermined time (and/or at predetermined intervals) so as to prevent vandals and/or software hackers from successfully decrypting or obtaining the obfuscated sensitive data. The predetermined time interval may be an estimate provided by a software lab of the time it may take an experienced and/or determined hacker to overcome the defenses provided by the white box SDK. Thus, in some implementations, for example, the consumer's root key is updated and the consumer's sensitive stored data are re-obfuscated at a suggested or estimated predetermined time in order to thwart any hacking attempts that may be ongoing. In addition, the disclosed methods can be used to obfuscate one or more of the encryption algorithms which have been used to encrypt the consumer's sensitive data.

Figure 2:
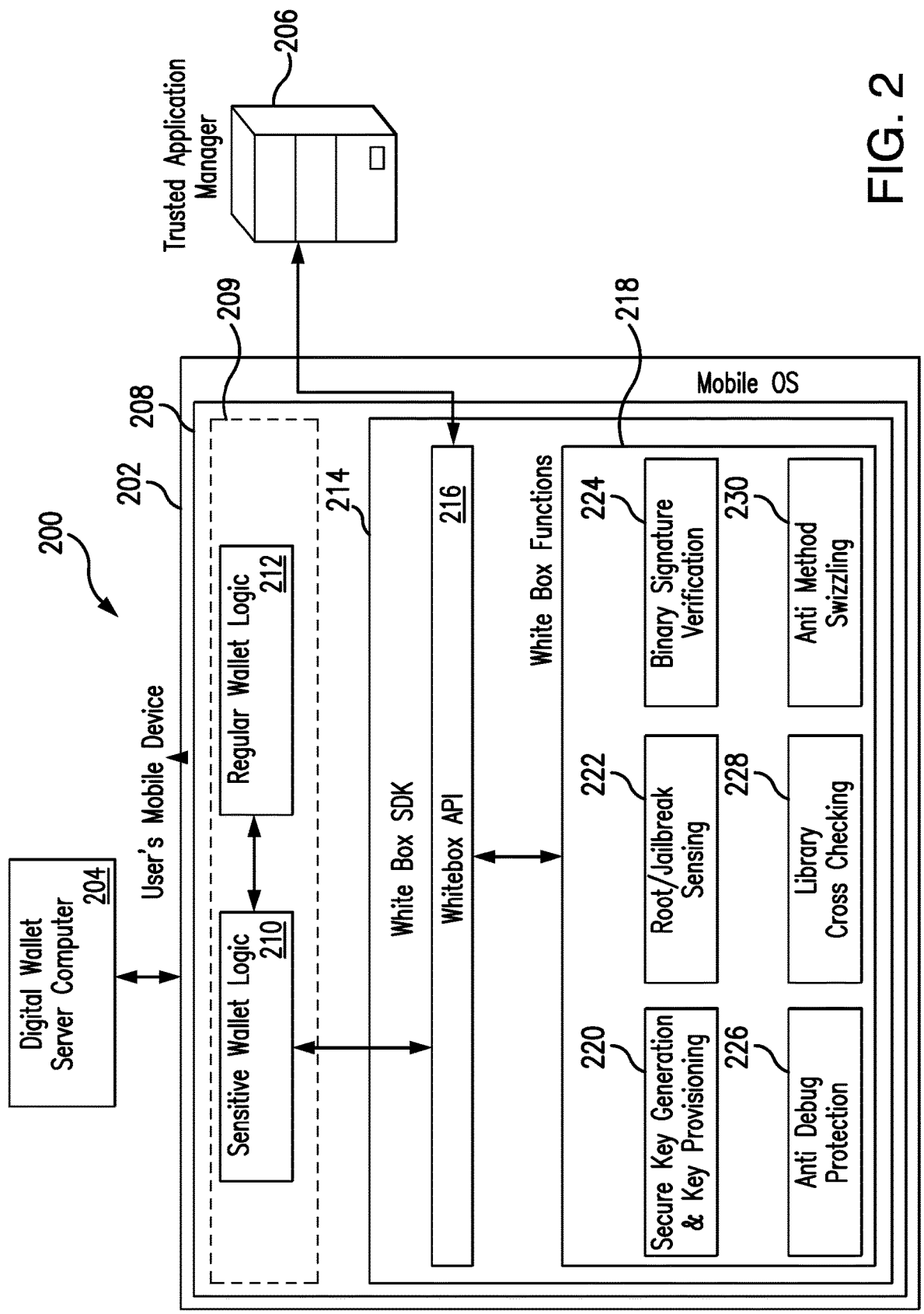
FIG. 2 is a block diagram of an embodiment of a consumer mobile device illustrating security aspects in accordance with some embodiments of the disclosure.

FIG. 2 is a block diagram of a system 200 that includes a consumer mobile device 202, a digital wallet server computer 204, and a trusted application manager server computer 206. The consumer mobile device 202 includes a mobile operating system environment 208 with a mobile wallet application 209, which has been downloaded by the user from the digital wallet server computer 204 (which may be operated by, for example, a bank that issues payment card accounts and the like financial accounts to consumers). In this example, the mobile wallet application 209 includes sensitive wallet logic 210 and regular wallet logic 212. The sensitive wallet logic 210 may include, for example, applications responsible for setting, retrieving and storing a consumer's personal identification number (PIN), payment card account data, user identification data, and/or other sensitive financial data. In contrast, the regular wallet logic 212 may include, for example, one or more applications responsible for providing a payment card account graphical user interface (GUI) to the consumer during a transaction, and/or for setting, retrieving and storing non-sensitive card account data, such as the logo of a card issuer for display on a display component (not shown) of the consumer mobile device 202. In this example, the sensitive wallet logic 210 of the mobile device digital wallet 209 is operably connected to a white box application program interface (API) 216 of a white box software development kit (SDK) 214. In some implementations, the white box SDK 214 is downloaded from the digital wallet server computer 204 when the digital wallet application 209 is downloaded. As shown, the white box SDK 214 is also operably connected via the white box API 216 to the trusted application manager computer 206.

The white box SDK 214 provides functionality to secure the sensitive wallet logic 210 with code logic protection via obfuscation and the like, while also obfuscating sensitive data that is stored in regular memory of the consumer mobile device 202. The white box SDK 214 also obfuscates the encryption and/or decryption algorithms utilized by the mobile device, to thereby hide the keys which are input to the encryption and/or decryption algorithms. In addition, the white box SDK 214 is configured to communicate with the trusted application manager 206 so as to re-obfuscate sensitive data and/or update the consumer's root key at predetermined time intervals. The predetermined time intervals may be obtained from testing lab results concerning hacking or vandalizing of data associated with the particular type of mobile application being executed, such as the digital wallet application of the present example. Such software testing lab results may utilize data and/or information concerning the types of hacking tools and/or vandalizing methods currently being used by hackers or vandals to steal sensitive data from the same or similar types of applications. Accordingly, in some implementations, the trusted application manager computer 206 provides secure white box key provisioning and trusted application management for the consumer's mobile device 202. In addition, the white box SDK 214 is configured for obfuscating one or more of the encryption and/or decryption algorithms utilized by the consumer mobile device to encrypt/decrypt the consumer's sensitive data.

Referring again to FIG. 2, the white box SDK 214 is a programming package developed by a developer or programmer (for example, a software developer or programmer at an issuer bank) that is compatible with the particular mobile device operating system (OS) running on the consumer's mobile device. The two most commons mobile operating systems are the Android™ OS, offered by Alphabet Inc. (Google), and the iOS™, offered by Apple Inc., and thus it is contemplated that the white box SDK will be configured to be compatible with such operating systems, and possibly other OS types as required and/or desired. In addition, in some implementations the white box SDK 214 may be provided to the digital wallet server computer 204 by the trusted application manager 206 so that it can be added to, for example, the developer's mobile wallet application (or other application). Thus a communications channel (not shown) may be opened between the digital wallet server computer 204 and the trusted application manager computer 206 for such purposes.

In some embodiments, the white box SDK 214 includes a White Box Functions 218. Accordingly, in some embodiments, the white box SDK 214 deploys the sensitive wallet logic in white box binary, and provides obfuscation of encryption algorithms and/or public key algorithms (such as the advanced encryption standard (AES), the elliptical curve digital signature algorithm (ECDSA), and/or RSA, which is a public key cryptosystem commonly used for secure data transmission) that are used to encrypt and store the consumer's PIN.

In the example implementation shown in FIG. 2, the vendor white box 218 includes a secure key generation and provisioning application 220, a root/jailbreak sensing application 222, a binary signature verification application 224, an anti-debug protection application 226, a library cross-checking application 228, and an anti-method swizzling application 230. It should be understood, however, that the White Box Functions may include less than or more than the applications shown in FIG. 2, which may depend upon criteria such as, for example, the OS running on the mobile device and/or the type of application and/or type of data being protected and/or obfuscated.

The secure key generation and provisioning application 220 may include and/or utilize one or more known symmetric-key algorithms (such as DES and AES) and/or public-key algorithms (such as RSA). Symmetric-key algorithms use a single shared key, and keeping data secret requires keeping this key secret, whereas public-key algorithms use a public key and a private key, wherein the public key is made available to anyone (often by means of a digital certificate) so that a sender can encrypt data with the public key and only the holder of the private key can decrypt this data. Computer cryptography uses integers for keys, and in some cases keys are randomly generated using a random number generator (RNG) or pseudorandom number generator (PRNG). PRNG is a computer algorithm that produces data that appears random under analysis, and PRNGs that use system entropy to seed data generally produce better results because the initial conditions of the PRNG are much more difficult for an attacker to guess. In other situations, the key is derived deterministically using a passphrase and a key derivation function. Thus, the secure key generation and key provisioning application 220 may operate with the trusted application manager 206 to generate, obfuscate, and store the consumer's key on the mobile device 214 for use to secure communications involving the digital wallet, such as communications involving a financial transaction.

The root/jailbreak sensing application 222 may be configured to detect a jailbroken mobile device. Jailbreaking on iOS™ (or 'rooting' on the Android™ OS) refers to the practice of leveraging a vulnerability in the operating system code to circumvent the device's built-in protections which include separate "jails" that are maintained for each application, and all of the controls that restrict what software is installed on the device (or that cannot be installed on the device). The code protection in this case provides a specific anti-rooting (or anti-jailbreaking) feature that will execute a defensive action if a rooted device is detected. Such detection and defensive action(s) may therefore improve the safety of mobile devices, for example, which are configured for connecting to a company network via a virtual private network (VPN) or corporate WiFi connection.

The binary signature verification application 224 can be used to create and verify signatures using the public/private key pair in an operation different from encryption and decryption. In particular, a signature is created using the private key of the signer, and can be verified using the corresponding public key. For example, person A uses her own private key to digitally sign a submission with a timestamp of time 1, and an editor handling her submission uses person A's public key to check the signature to verify that the submission indeed came from person A and that it had not been modified since person A sent it at time 1. If the document is subsequently modified in any way, a verification of the signature will fail. A digital signature can serve the same purpose as a hand-written signature with the additional benefit of being tamper-resistant. Thus, the binary signature verification application 224 can be utilized when a mobile device application needs to communicate sensitive information, for example, to an entity during a particular type of transaction.

The anti-debug protection application 226 can be used to make it very difficult for a hacker to reverse-engineer the encryption algorithms utilized to encrypt a consumer's sensitive data. In particular, this technique allows a program to detect that it is being analyzed by a debugger and permits the program to perform counteractions.

The library cross-checking application 228 permits selection of specific shared library files (for example, .dll and/or .so files) from your application, and then code protection will calculate the cryptographic checksum signatures of their binary code and embed these signatures in the main application during a protection phase. Next, at arbitrary places in the application code a special function is invoked that checks if the signature of a particular shared library loaded in the memory matches the previously recorded signature. If a match occurs, then no problem is indicated and the application executes normally. However, if a match does not occur, then the application may shut down, or may continue to operate but take other precautionary measures (such as restricting certain capabilities, such as a purchasing capability).

The anti-method swizzling application 230 may be applied to Objective C applications to prevent modification of executable code so that certain method names are not mapped to different method implementations. Method swizzling is frequently used to replace or extend methods in binaries for which the source code is not available, and this code obfuscation technique thus makes it more difficult for a hacker to obtain sensitive information.

Figure 3:
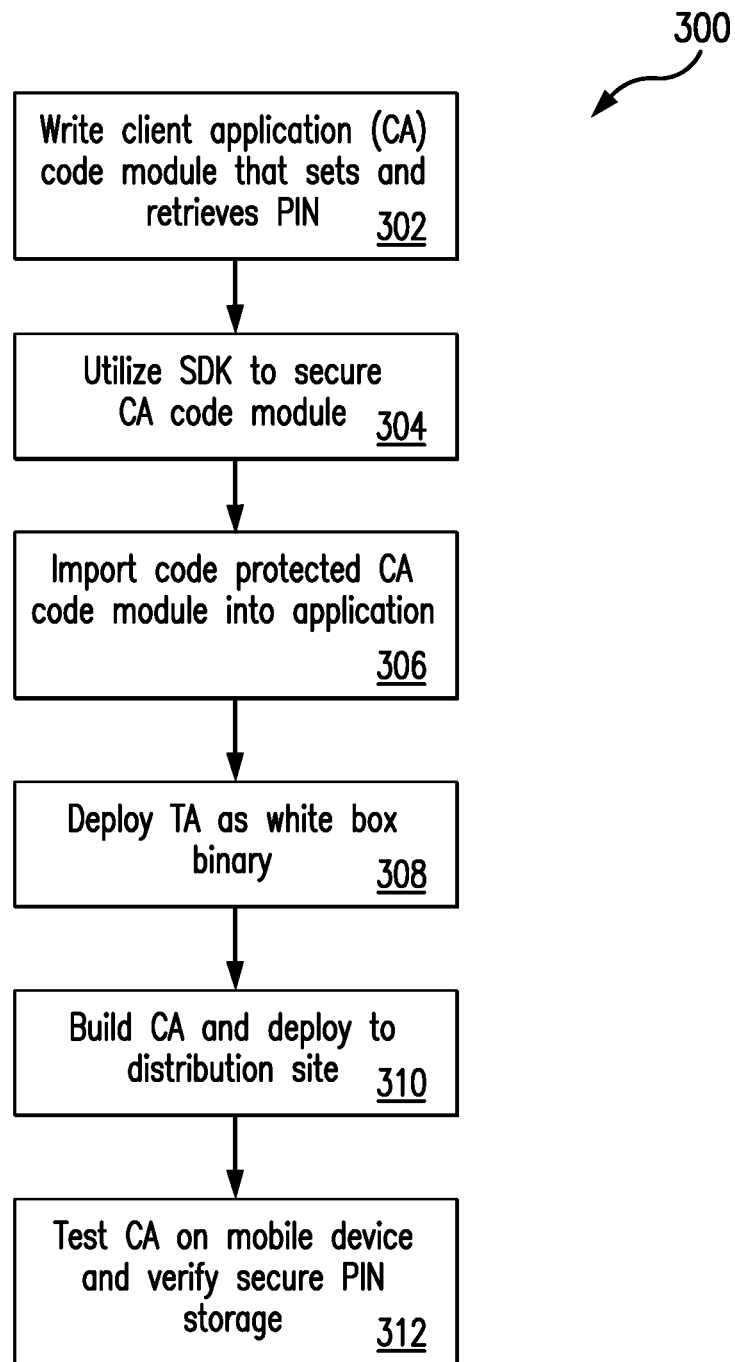
FIG. 3 is a flowchart of a process according to an embodiment of the disclosure.

FIG. 3 is a flowchart 300 illustrating a secure client application development process in accordance with the disclosure. A software developer writes 302 a Client Application (CA) code module that sets and retrieves the personal identification number (PIN) of a user (the CA code module may be used as part of, for example, a mobile device application such as a digital wallet application). In some embodiments, the CA code module (and the mobile device application) is configured for deployment in a framework (such as the iOS framework) of a mobile device. Next, the software developer utilizes 304 a code protection software development kit (SDK) to secure the CA code module (which sets and retrieves the user's PIN) by executing processes such as anti-debugging and the like. In some embodiments, the code protection SDK may be obtained from a third party entity, such as a payment processing company like MasterCard International Incorporated. The code protected CA module is then imported 306 into the rest of the Client Application (for example, it is imported into a mobile device digital wallet application).

Referring again to FIG. 3, the code protected CA, or trusted application (TA), is then deployed 308 as a white box binary for consumer mobile devices which do not include secure memory or secure storage devices. The TA provides the code-protected CA (which sets and retrieves the PIN) with AES, ECDSA and RSA software process support, which algorithms are used to encrypt and then store the consumer's PIN. The TA is considered as a secure environment that is physically separate from the OS of the consumer's mobile device, and/or sufficiently protected with code protection or proven White Box security methodologies.

Next, the developer builds 310 the CA using the OS (Android or iOS) method appropriate to the consumer's mobile device OS. In some embodiments, the CA is then deployed to a distribution website, such as Google Play store of the Apple iTunes store. In some embodiments, the software developer then tests 312 the CA by executing it to verify the secure storage of the user's PIN. For example, a programmer or developer, who is familiar with the internal structure and/or design and/or implementation of the CA, validates the code of the application that captures, encrypts and stores the user's PIN.

Figure 4:
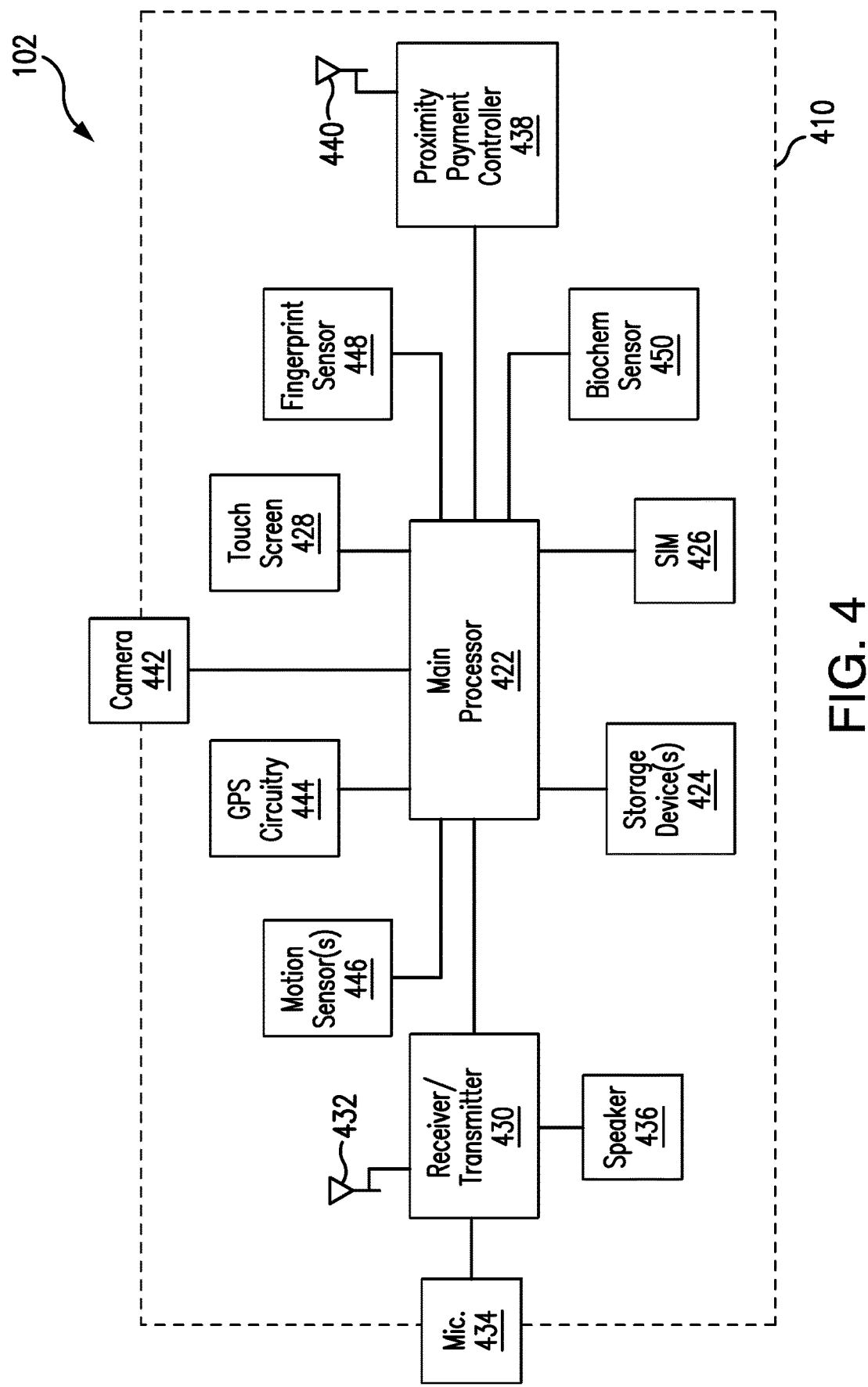
FIG. 4 is a block diagram to illustrate hardware aspects of a mobile device that may be utilized in accordance with some embodiments of the disclosure.

FIG. 4 is a block diagram of an embodiment of a user's mobile device 102 to illustrate hardware aspects of a consumer mobile device that may be utilized in accordance with methods disclosed herein. In this example, the user's mobile device is a mobile telephone 102 or Smartphone that may (but need not) have capabilities for functioning as a contactless payment device. In particular, the user's mobile device 102 may be a payment-enabled mobile device capable of initiating purchase transactions in a payment system or payment network. The mobile telephone 102 may utilize conventional and/or specialized and/or customized hardware components, and is configured to provide novel functionality as described herein. In some embodiments, however, novel functionality as described herein results at least partially from novel software and/or firmware that programs or instructs one or more mobile device processors of the mobile telephone 102.

The mobile telephone 102 may include a conventional housing (indicated by dashed line 410) that contains and/or supports hardware components. The mobile telephone 102 includes a main processor 422 for controlling over-all operation, for example, it may be suitably programmed to allow the mobile telephone 102 to engage in data communications and/or text messaging with other wireless devices and/or electronic devices, and to allow for interaction with web pages accessed via browser software over the Internet, which is not separately shown. Other components of the mobile telephone 102, which are in communication with and/or are controlled by the mobile device processor 422, include one or more storage devices 424 (which may include, for example, one or more of program memory devices and/or working memory and/or regular storage devices and/or secure storage devices, and the like), a conventional subscriber identification module (SIM) card 426, and a touch screen display 428 for displaying information and/or for receiving user input.

The mobile telephone 102 also includes receive/transmit circuitry 430 that is in communication with and/or controlled by the mobile device processor 422. The receive/transmit circuitry 430 is operably coupled to an antenna 432 and provides the communication channel(s) by which the mobile telephone communicates via a mobile network (not shown). The mobile telephone 102 further includes a microphone 434 operably coupled to the receive/transmit circuitry 430, and the microphone 434 is operable to receive voice input from the user. In addition, a loudspeaker 436 is also operably coupled to the receive/transmit circuitry 430 and provides sound output to the user.

The mobile telephone 102 may also include a proximity payment controller 438 which may be an integrated circuit (IC) or chipset of the type embedded in contactless payment cards. The proximity payment controller 438 is operably connected to an antenna 440 and may function to interact with a Radio Frequency Identification (RFID) and/or Near Field Communication (NFC) proximity reader (not shown), which may be associated, for example, with a Point-of-Sale (POS) terminal of a merchant. For example, the proximity payment controller 438 may operate to obtain sensitive information, such as a user's payment card account number, when the consumer uses the mobile telephone 102 to conduct a purchase transaction with a POS terminal associated with a merchant.

The mobile telephone 102 may include one or more sensors and/or circuitry that functions to provide and/or obtain authentication data concerning the mobile telephone and/or the user. In particular, the mobile telephone 102 may be a Smartphone that includes an integrated camera 442 operably connected to the mobile device processor 422, and that can be utilized for various functions. For example, the integrated camera 442 can take pictures, can be operated to read a two-dimensional (2D) barcode to obtain information, and/or can be operated during an authentication process to take a picture of the user's face and/or of other relevant items. The mobile telephone 102 may also include Global Positioning System (GPS) circuitry 444 operably connected to the mobile device processor 422, and operable to generate information concerning the location of the mobile telephone.

The mobile telephone 102 may also include one or more motion sensor(s) 446, a fingerprint sensor 448, and/or a biochemical sensor 450. The motion sensor(s) 146 may be operable to generate motion data, for example, that can be utilized by the mobile device processor 422 to authenticate a user by, for example, identifying the user's walking style or gait. In another example, the motion sensor(s) 446 may operate to generate force data associated with, for example, the force generated by the user's finger when he or she touches the touch screen 428. The fingerprint sensor 448 may include a touch pad or other component (not shown) for use by the user to touch or swipe his or her index finger when fingerprint data is required to authenticate the user in order to conduct a transaction (such as provide entry to a building). The biochemical sensor 450 may include one or more components and/or sensors operable to obtain user biological data, such as breath data from the user, and/or other types of biological data which may be associated with the user of the mobile device 102. The data obtained by the motion sensor(s) 446, fingerprint sensor 448 and/or biochemical sensor 450, may be utilized for comparison to biometric data and/or information of the user that has been stored, for example, in one or more of the local storage device(s) 424 in order to authenticate the user of the mobile telephone 102. In accordance with processes disclosed herein, such data may be secured by use of a white box SDK which has been downloaded to the mobile device 102 which includes instructions executed by the mobile device processor 422.

In addition, in some embodiments, the mobile device processor 422 and receiver/transmitter circuitry 430 may be operable to transmit the results of the cardholder or user authentication process (whether or not a match occurred) to an issuer financial institution (FI) and/or a payment network (not shown) for further processing. The mobile device processor 422 and receiver/transmitter circuitry 430 may also be operable to transmit generated GPS data to an issuer FI and/or to a payment network, for example, regarding the current location of the mobile device 102. The user's mobile device may also contain one or more other types of sensors, such as an iris scanner device (not shown) for generating iris scan data of a user's eye, which may be useful for identifying biometric or other personal data of the mobile device user.

In some embodiments, the mobile device processor 422 may download an application, such as a digital wallet application compatible with the operating system of the mobile device, from a digital wallet server computer 204 (see FIG. 2). When implementing the mobile wallet application, the mobile device processor 422 executes a code protection process resident within the mobile wallet application to obfuscate sensitive user data, such as the consumer's personal identification number (PIN) and financial account data. The mobile device processor 422 then stores the obfuscated user data in a regular memory 424. The mobile device processor 422 also executes a white box software development kit (SDK) included in the digital wallet application, which monitors and protects sensitive applications which are configured to execute when conducting transactions, such as purchase transactions. In addition, the mobile device processor receives, from a trusted application manager computer (not shown), instructions at predetermined time intervals to re-obfuscate the sensitive user data and/or to reset a user root key to make it extremely difficult or impossible for a hacker to obtain sensitive data from the consumer's mobile device.

As will be appreciated based on the foregoing specification, the above-described examples of the disclosure may be implemented using computer programming or engineering techniques including computer software, firmware, hardware, middleware or any combination or subset thereof. Any such resulting program, having computer-readable code, may be embodied or provided within one or more non-transitory computer-readable media, thereby making a computer program product, i.e., an article of manufacture, according to the examples discussed herein. For example, suitable non-transitory computer-readable media may include, but is not limited to, a fixed drive, diskette, optical disk, magnetic tape, bubble memory, flash memory, semiconductor memory such as read-only memory (ROM), Nano memory cell(s), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in an assembly language and/or machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. In addition, one or more of the steps may not be required for performance in some embodiments.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for protecting sensitive data and applications stored in a regular memory of a mobile device, comprising:
downloading, by a mobile device processor of a mobile device from a digital wallet server computer by a consumer, a mobile wallet application including a white box software development kit (SDK) which includes code protection processes;
obfuscating, by the mobile device processor running the downloaded code protection processes of the white box SDK, consumer financial data and consumer authentication data;
storing, by the mobile device processor, the obfuscated consumer financial data and consumer authentication data in a regular memory of the mobile device; protecting, by the mobile device processor running at least an anti-debug protection application of the white box SDK, sensitive applications stored in the regular memory which execute during a transaction from attack;
re-obfuscating, by the mobile device processor running the white box SDK, at least one of the consumer financial data and the consumer authentication data according to a predetermined time interval; and
resetting, by the mobile device processor in response to the re-obfuscating, at least one key used to one of encrypt or decrypt at least one of the consumer financial data and the consumer authentication data.

2. The method of claim 1, further comprising, prior to protecting the sensitive applications stored in the regular memory: obfuscating, by the mobile device processor running the white box SDK, at least one encryption algorithm stored in the regular memory; and storing, by the mobile device processor running the white box SDK, the obfuscated encryption algorithm in the regular memory.

3. The method of claim 1, wherein re-obfuscating, by the mobile device processor, at least one of the consumer financial data and the consumer authentication data comprises: receiving, by the mobile device processor running the white box SDK from a trusted application manager computer, instructions defining the predetermined time interval; and re-obfuscating, by the mobile device processor running the white box SDK, the at least one of the consumer financial data and the consumer authentication data in accordance with the instructions.

4. The method of claim 3, wherein the predetermined time interval is based on testing lab results concerning hacking of data associated with the mobile wallet application.

5. The method of claim 1, wherein the white box SDK comprises white box functions that at least one of deploys sensitive logic in white box binary and obfuscates public key algorithms.

6. The method of claim 5, wherein the white box functions comprises an anti-debugging application and at least one of a secure key generation and key provisioning application, a rooting/jailbreaking application, a binary signature verification application, a library cross-checking application, and an anti-swizzling application.

7. The method of claim 1, wherein the consumer authentication data comprises at least one of consumer biometric data, a consumer personal identification number (PIN), and a mobile PIN.

8. A system comprising:
a trusted application manager computer;
a digital wallet server computer; and
a consumer mobile device configured for communicating with the trusted application manager computer and with the digital wallet server computer, the consumer mobile device comprising:
a mobile device processor;
at least one storage device operably connected to the mobile device processor;
receive and transmit circuitry operably connected to the mobile device processor; and
at least one biometric sensor operably connected to the mobile device processor; and wherein the at least one storage device comprises instructions configure to cause the mobile device processor to:
download, from the digital wallet server computer, a mobile wallet application including a white box software development kit (SDK) which includes code protection processes;
obfuscate consumer financial data and consumer authentication data by running the downloaded code protection processes of the white box SDK;
store the obfuscated consumer financial data and consumer authentication data in a regular memory of the mobile device;
run at least an anti-debug protection application of the white box SDK to protect sensitive applications stored in the regular memory which execute during a transaction from attack;
re-obfuscate at least one of the consumer financial data and the consumer authentication data according to a predetermined time interval; and
reset at least one key used to one of encrypt or decrypt at least one of the consumer financial data and the consumer authentication data in response to the re-obfuscating.

9. The system of claim 8, further comprising, prior to the instructions for protecting the sensitive applications, instructions configured to cause the mobile device processor to:
obfuscate at least one encryption algorithm stored in the regular memory; and store the obfuscated encryption algorithm in the regular memory.

10. The system of claim 8, wherein the instructions for re-obfuscating at least one of the consumer financial data and the consumer authentication data comprise instructions causing the mobile device processor to:
receive instructions from the trusted application manager computer defining the predetermined time interval; and
re-obfuscate at least one of the consumer financial data and the consumer authentication data in accordance with the instructions.

11. The system of claim 10, wherein the predetermined time interval is based on testing lab results concerning hacking of data associated with the mobile wallet application.

12. The system of claim 8, wherein the white box SDK comprises white box function instructions configured to cause the mobile device processor to at least one of deploy sensitive logic in white box binary and obfuscate public key algorithms.

13. The system of claim 12, wherein the white box function instructions cause the mobile device processor to provide an anti-debugging application and at least one of a secure key generation and key provisioning application, a rooting/jailbreaking application, a binary signature verification application, a library cross-checking application, and an anti-swizzling application.

14. The system of claim 8, wherein the consumer authentication data comprises at least one of consumer biometric data, a consumer personal identification number (PIN), and a mobile PIN.

* * * * *